US012786441B2

(12) United States Patent
Shan

(10) Patent No.: US 12,786,441 B2
(45) Date of Patent: Nov. 3, 2026

(54) ENCODING TABLE GENERATION METHOD, ENCODING METHOD, DECODING METHOD, PROGRAM PRODUCT, AND PROCESSING DEVICE

(71) Applicant: Robert Bosch GmbH, Stuttgart (DE)

(72) Inventor: Huimin Shan, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/302,023

(22) Filed: Aug. 17, 2025

(65) Prior Publication Data

US 2026/0052261 A1 Feb. 19, 2026

(30) Foreign Application Priority Data

Aug. 19, 2024 (CN) ........................ 202411139070.5

(51) Int. Cl.
*H04N 19/189* (2014.01)

(52) U.S. Cl.
CPC .................................. *H04N 19/189* (2014.11)

(58) Field of Classification Search
CPC .................................................. H04N 19/189
See application file for complete search history.

(56) References Cited

U.S. PATENT DOCUMENTS

2005/0273210 A1* 12/2005 Pfaffeneder ......... B60R 16/0315 701/1
2013/0151894 A1* 6/2013 Honda .................. G06F 11/079 714/17

* cited by examiner

*Primary Examiner* — Kathleen V Nguyen
(74) *Attorney, Agent, or Firm* — Maginot, Moore & Beck LLP

(57) ABSTRACT

A method of generating an encoding table for sensor signals of a vehicle includes (i) obtaining the frequency at which sensor signals occur, (ii) classifying the sensor signals into different levels according to the occurrence frequency, with the level number related to the number of encoding bits, wherein the higher the occurrence frequency, the smaller the level number and the smaller the number of encoding bits, (iii) assigning binary codes to the sensor signals, wherein the binary code has a single middle bit, front bits before the middle bit, and rear bits after the middle bit, the middle bit is written into a first bit value, the number of the front bits characterizes the level and is written into a second bit value, and the number of the rear bits depends on the number of the front bits and the value of the sensor signal is mapped out by the bit value of the rear bits, and (iv) generating an encoding table to establish corresponding relationships between the sensor signals and the binary codes. A corresponding encoding method, decoding method, computer program product, and processing device are also disclosed. This can reduce the memory required to record sensor signals.

19 Claims, 3 Drawing Sheets

ENCODING TABLE GENERATION METHOD, ENCODING METHOD, DECODING METHOD, PROGRAM PRODUCT, AND PROCESSING DEVICE

This application claims priority under 35 U.S.C. § 119 to application no. CN 2024 1113 9070.5, filed on Aug. 19, 2024 in China, the disclosure of which is incorporated herein by reference in its entirety.

The present disclosure relates to the field of signal processing, and in particular to an encoding table generation method for sensor signals of a vehicle. The present disclosure also relates to a corresponding method for encoding sensor signals of a vehicle, a corresponding method for decoding sensor signals of a vehicle, a corresponding computer program product, and a corresponding processing device for sensor signals of a vehicle.

BACKGROUND

In recent years, with the development of technology and the improvement of living standards, requirements for vehicle safety and intelligence have become increasingly high. To this end, the number of sensor signals of the vehicle that need to be detected, processed, and stored has increased significantly, wherein the sensor signals need to be encoded in order to store the sensor signals. Typically, sensor signals are encoded into binary codes with fixed length; i.e., the length of all binary codes is the same.

However, some sensor signals of the vehicle, such as acceleration signals, are not uniformly distributed and generally fluctuate around a middle value, such that the sensor signal is at or close to the middle value in most cases; i.e., sensor signals in the vicinity of the middle value have a significantly higher frequency of occurrence, and only in a few cases will abnormal sensor signals that deviate greatly from the middle value appear, while abnormal sensor signals have a lower frequency of occurrence. Therefore, recording these high-frequency sensor signals requires a large amount of memory, which increases the cost of storage hardware.

SUMMARY

Therefore, the purpose of the present disclosure is to propose an improved encoding table generation method for vehicle sensor signals, through which an adaptive encoding table can be generated according to the frequency of occurrence of sensor signals. This optimizes the encoding and decoding process of sensor signals, reduces the average encoding length in a lossless manner, and significantly reduces the memory required for recording sensor signals, thereby improving data storage and transmission efficiency and saving hardware costs for signal processing.

According to a first aspect of the present disclosure, an encoding table generation method for sensor signals of a vehicle is provided, wherein the encoding table generation method comprises at least the following steps:

S11: obtaining the occurrence frequencies of sensor signals;

S12: classifying the sensor signals into different levels according to the occurrence frequencies, with the level number related to the number of encoding bits, wherein the higher the occurrence frequency, the smaller the level number and the smaller the corresponding number of encoding bits;

S13: assigning binary codes to the sensor signals in different levels, wherein the binary code has a single middle bit, front bits before the middle bit, and rear bits after the middle bit, the middle bit is written into a first bit value, the number of the front bits characterizes the level and is written into a second bit value, and the number of the rear bits depends on the number of front bits and the value of the sensor signal is mapped out by the bit value of the rear bits;

S14: generating an encoding table for the sensor signals to establish corresponding relationships between the sensor signals and the binary codes.

Compared with the prior art, in the encoding table generation method for sensor signals of a vehicle according to the present disclosure, the sensor signals are classified into different levels according to the occurrence frequencies of the sensor signals. The higher the occurrence frequency, the smaller the level number and the smaller the corresponding number of encoding bits. A binary code is then assigned to each sensor signal in different levels. The binary code has a single middle bit, front bits, and rear bits, wherein the middle bit is written into a first bit value, the number of front bits characterizes the level and is written into a second bit value, and the number of rear bits depends on the number of the front bits and the value of the sensor signal is mapped out by the bit value of the rear bits. The coordination of the middle bit, the front bits, and the rear bits can clearly indicate the level, encoding length, and mapping value of the sensor signal, so that the sensor signal can be encoded and decoded in a lossless manner. As a result, sensor signals with higher occurrence frequencies are assigned shorter binary codes, while sensor signals with lower occurrence frequencies are assigned longer binary codes, which can minimize the overall encoding length and thereby improve the storage and transmission efficiency of sensor signals and save hardware costs for signal processing.

According to a second aspect of the present disclosure, an encoding method for sensor signals of a vehicle is provided, wherein the encoding method comprises at least the following steps:

S21: obtaining the sensor signals and encoding table, wherein the encoding table is generated by the encoding table generation method according to the present disclosure;

S22: encoding the sensor signals into corresponding binary codes according to the encoding table.

According to a third aspect of the present disclosure, a decoding method for sensor signals of a vehicle is provided, wherein the decoding method comprises at least the following steps:

S31: obtaining a binary code stream and an encoding table, wherein the binary code stream has at least one binary code encoded by the sensor signal and the encoding table is generated by the encoding table generation method according to the present disclosure;

S32: splitting the binary code from the binary code stream by reading the second bit value from the starting bit of the binary code until the first bit value is reached, the bit of the first bit value is the middle bit of the binary code and the bit of the second bit value is the front bit of the binary code, and determining the number of rear bits of the binary code according to the number of the front bits so as to determine the number of encoding bits of the binary code;

S33: obtaining the sensor signal according to the binary code and the encoding table, wherein the level of the sensor signal is determined by the number of the front bits of the binary code and the value of the sensor signal is mapped by the bit value of the rear bits of the binary code.

According to a fourth aspect of the present disclosure, a computer program product is provided, which comprises a computer program, wherein, when the computer program is executed by one or more processors, the processor is capable of executing the encoding table generation method according to the present disclosure and/or the encoding method according to the present disclosure and/or the decoding method according to the present disclosure.

According to a fifth aspect of the present disclosure, a processing device for sensor signals of a vehicle is provided, wherein the processing device comprises at least:

an encoding table generation module configured to implement the encoding table generation method according to the present disclosure to generate an encoding table for the sensor signal; and/or an encoding module configured to implement the encoding method according to the present disclosure to encode the sensor signal into a corresponding binary code; and/or a decoding module configured to implement the decoding method according to the present disclosure to decode a binary code into a sensor signal.

BRIEF DESCRIPTION OF THE DRAWINGS

In the following, the present disclosure is described in greater detail with reference to the accompanying drawings to provide a better understanding of its principles, features, and advantages. The accompanying drawings include the following.

DETAILED DESCRIPTION

To provide a clearer understanding of the technical problems, technical solutions, and beneficial technical effects to be addressed by the present disclosure, the following detailed description of the present disclosure will be provided with reference to the accompanying drawings and multiple exemplary examples.

The present specification provides method operation steps as described in the embodiments or flow charts, but more or fewer operation steps may be included based on routine or non-creative work. The order of steps listed in the example is only one way of executing the steps among many orders and does not represent the only order of execution.

It should be understood that in this document, terms such as "first", "second", etc., are used for descriptive purposes only and should not be construed as indicating or implying relative importance. Furthermore, such terms should not be understood as implying a specific quantity of the indicated technical features. Features defined as "first" and "second" may expressly or implicitly mean that at least one of the features is included.

Figure 1:
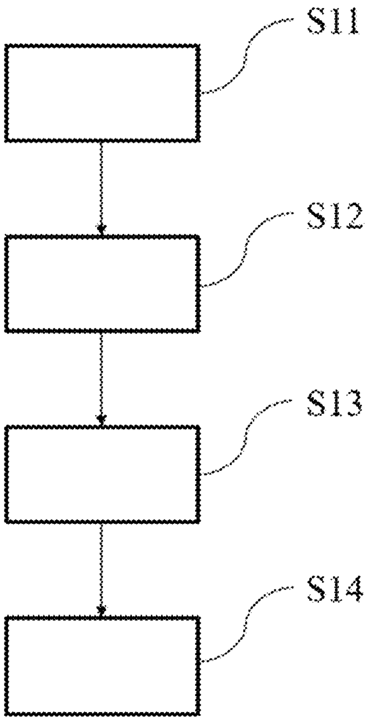
FIG. 1 shows a schematic flow chart of an encoding table generation method for a sensor signal of a vehicle according to an exemplary example of the present disclosure.

FIG. 1 shows a schematic flow chart of an encoding table generation method for sensor signals of a vehicle according to an exemplary example of the present disclosure. Here, the encoding table generated according to the encoding table generation method can be used in a subsequent encoding and decoding process of a sensor signal, wherein the sensor signal is, for example, an acceleration signal of a vehicle detected by an acceleration sensor, in particular a collision acceleration signal. Of course, it is also conceivable that the sensor signal is another signal that is considered meaningful by a person skilled in the art, such as a temperature signal or the like. The encoding table generation method described below will be explained in detail with the acceleration signal as the sensor signal.

As shown in FIG. 1, the encoding table generation method according to the present disclosure includes at least the steps of:

S11: obtaining the occurrence frequency of a sensor signal, where the sensor signal is, for example, an acceleration signal, and the occurrence frequency can reflect the distribution law of the acceleration signal, wherein the acceleration signal is exemplarily in the range of −120 g to +120 g and is, for example, presented in the form of a normal distribution with an average value of 0, so that most acceleration signals have values of 0 or close to 0, especially in the range of −4 g to +4 g, a few acceleration signals will reach or exceed ±32 g, and very few acceleration signals will reach a limit value of 120 g, wherein the occurrence frequency of the sensor signal can be obtained based on sampling data statistics, where the sampling data is, for example, experimental data and/or historical data and has sampling values of multiple sensor signals, and the occurrence frequency of the corresponding sensor signal can be obtained by statistically analyzing the proportion of each sampling value in the sampling data, but it is also possible to calculate the occurrence frequency of the sensor signal according to an empirical distribution curve, where the empirical distribution curve can be drawn based on an empirical formula, such as a normal distribution curve or a bimodal distribution curve, etc.;

S12: classifying the sensor signals into different levels according to the occurrence frequencies of the sensor signals, the levels respectively having corresponding numbers and the level numbers being related to the number of encoding bits, wherein when the occurrence frequency of a sensor signal is higher, the level number corresponding to the sensor signal is smaller and the corresponding number of encoding bits is smaller. As a result, a sensor signal with a higher occurrence frequency is assigned a shorter binary code, while a sensor signal with a lower occurrence frequency is assigned a longer binary code;

S13: assigning binary codes to the individual sensor signals in different levels, wherein the binary code may have a single middle bit, front bits before the middle bit, and rear bits after the middle bit, wherein a first bit value is written into the middle bit, the first bit value being, for example, 0, and a second bit value is written into the front bit, the second bit value being correspondingly 1, and the number of the front bits characterizes the level, while the number of the rear bits depends on the number of the front bits and the value of the sensor signal can be mapped by the bit value of the rear bit. Of course, it is also possible for the first bit value to be 1 and the second bit value to be 0;

Table 1 below exemplarily shows a schematic encoding table of an acceleration signal of a vehicle, wherein the encoding table is generated by the encoding table generation method according to the present disclosure:

TABLE 1

| Level | Acceleration (g) | Binary Code |
|---|---|---|
| 0 | 0 | 0 |
| 1 | −1 | 10 |
| 2 | 1, 2 | 1100, 1101 |
| 3 | −2, −3, 3, 4 | 111000, 111001, 111010, 111011 |
| 4 | −4, −5, −6, −7, 5, 6, 7, 8 | 11110000, 11110001, 11110010, . . . , 11110111 |
| 5 | −8, . . . −15, 9 . . . 16 | 1111100000, . . . , 1111101111 |
| 6 | −16, . . . −31, 17, . . . 31 | 111111000000, . . . , 111111011111 |
| 7 | −32, . . . −63, 33, . . . 64 | 11111110000000, . . . , 11111110111111 |
| 8 | −64, . . . −127, 64, . . . 128 | 1111111100000000, . . . , 1111111101111111 |

S14: after traversing all sensor signals and assigning binary codes to the various sensor signals, generating an encoding table for the sensor signals to establish a corresponding relationship between the sensor signals and the binary codes, thereby enabling mutual conversion between the sensor signals and the binary codes.

Exemplarily, the number of front bits of the binary code is equal to the number of the level and the number of rear bits is equal to the number of front bits minus 1. Specifically, for the sensor signal of level 1, the number of front bits is 1 and the number of rear bits is 0, while for the sensor signal of level 2, the number of the front bits is 2 and the number of rear bits is 1, and so on. However, it can also be considered that, according to actual needs, there are other corresponding relationships between the number of levels, the number of front bits, and the number of rear bits that are considered meaningful by those skilled in the art; for example, the number of front bits of the binary code is equal to the number of the level plus 1 and the number of rear bits is equal to the number of front bits.

Exemplarily, in step S12, sensor signals with the same or similar occurrence frequencies are classified into the same level, so that the number of sensor signals in the level is equal to $2^n$, where n is equal to the number of rear bits. In particular, the number of front bits is equal to the level number and the number of rear bits is equal to the number of front bits minus 1; that is, the level number and the number of front bits are both n+1, so that the number of encoding bits of the binary code of the (n+1)th level is 2*(n+1) and the number of sensor signals in this level is equal to $2^n$. In this case, the number of encoding bits of the binary code of level 1 is 2 and the corresponding number of sensor signals is 1, the number of encoding bits of the binary code of level 2 is 4 and the corresponding number of sensor signals is 2, the number of encoding bits of the binary code of level 3 is 6 and the corresponding number of sensor signals is 4, the number of encoding bits of the binary code of level 4 is 8 and the corresponding number of sensor signals is 8, and so on.

In particular, the sensor signal with the highest occurrence frequency is classified into level 0, and the number of front bits and rear bits of the binary code corresponding to the sensor signal are both 0; that is, the binary code has only a single middle bit. The highest frequency sensor signal can thus be mapped using the shortest binary code. In this case, the sensor signal with the second highest occurrence frequency is classified into level 1, the sensor signals with the third and fourth highest frequency of occurrence are classified into level 2, and so on.

It can be clearly seen from Table 1 that the acceleration 0 g with the highest frequency in the acceleration signal is in level 0 and the corresponding binary code is 0, the acceleration-1 g with the second highest frequency is in level 1 and the corresponding binary code is 10, the accelerations 1 g and 2 g with the third and fourth highest frequencies are in level 2 and the corresponding binary codes are 1100 and 1101, respectively, and so on. Here, for each level, the second bit value 1 is written at the front bit and the first bit value 0 is written at the middle bit, thereby making it easy to separate the front bit from the rear bit and clearly indicating the level of the sensor signal to which the binary code corresponds. If the first bit value is set to 1 and the second bit value is set to 0, a suitable encoding table can also be generated in the same way. Moreover, depending on actual needs, the relationship between the number of levels, the number of front bits, and the number of rear bits can also be changed so as to adaptively change the number of sensor signals accommodated in each level and the corresponding number of encoding bits. In different levels, the mapping between the bit value of the rear bit of the binary code and the acceleration signal can be easily obtained by the encoding method known in the prior art, which will not be described in detail here.

Figure 2:
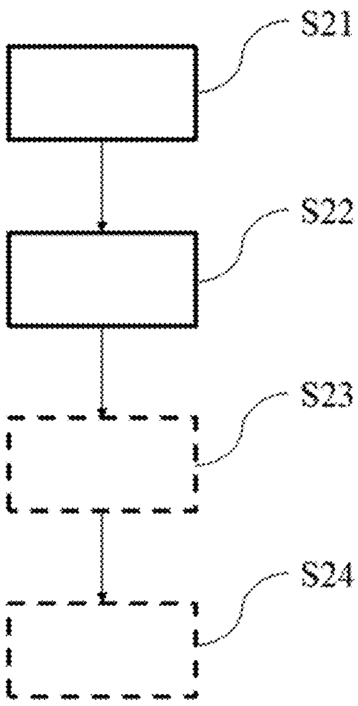
FIG. 2 shows a schematic flow chart of a method for encoding a sensor signal of a vehicle according to an exemplary example of the present disclosure.

FIG. 2 shows a schematic flow chart of a method for encoding a sensor signal of a vehicle according to an exemplary example of the present disclosure.

As shown in FIG. 2, the encoding method according to the present disclosure includes at least the steps of:

S21: obtaining a sensor signal detected by a sensor of the vehicle and an encoding table, wherein the encoding table is generated by the encoding table generation method according to the present disclosure, wherein the encoding table may be directly obtained from an external source or may be pre-generated and stored in an internal processor;

S22: encoding the sensor signal into a corresponding binary code according to the encoding table.

The resulting encoded binary code may have an encoding length or an encoding bit number that changes accordingly according to the occurrence frequency of the sensor signal, so that frequently occurring sensor signals can be recorded with short binary codes, which can reduce total byte consumption and save memory for storing binary codes overall.

Exemplarily, as shown in FIG. 2, the encoding method further comprises a step S23: arranging the binary codes corresponding to the multiple sensor signals detected sequentially in time in succession to form a binary code stream. In the framework of the present disclosure, a "binary code stream" should be understood as a stream consisting of a series of binary codes, so that the data are arranged continuously in a specific order in the stream. This enables the continuous encoding and recording of sensor signals.

Exemplarily, as shown in FIG. 2, the encoding method further comprises a step S24: writing a second bit value, such as 1, into unused memory after the sensor signal is encoded. This makes it easy to distinguish the binary codes corresponding to the unused memory and sensor signals and prevent information leakage and malicious use of data.

Figure 3:
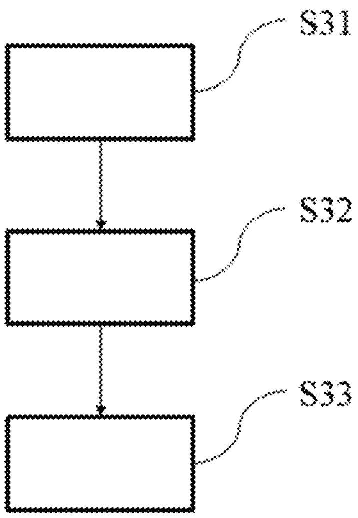
FIG. 3 shows a schematic flow chart of a method for decoding a sensor signal of a vehicle according to an exemplary example of the present disclosure.

FIG. 3 shows a schematic flow chart of a method for decoding a sensor signal of a vehicle according to an exemplary example of the present disclosure.

As shown in FIG. 3, the decoding method according to the present disclosure includes at least the steps of:

- S31: obtaining a binary code stream and an encoding table, wherein the binary code stream has at least one binary code encoded by the sensor signal and the encoding table is generated by the encoding table generation method according to the present disclosure;
- S32: splitting the binary code from the binary code stream by reading the second bit value from the starting bit of the binary code until the first bit value is reached, the bit of the first bit value is the middle bit of the binary code and the bit of the second bit value is the front bit of the binary code, and determining the number of rear bits of the binary code according to the number of the front bits so as to determine the number of encoding bits of the binary code, wherein the starting bit of the binary code can be determined by a pre-set check code or by the rear bit of the previous binary code to accurately determine the front bit of the binary code;
- S33: when the number of coding bits, front bits, and rear bits of the binary code is determined, decoding the sensor signal according to the binary code and the encoding table, wherein the level of the sensor signal is determined by the number of front bits of the binary code and the value of the sensor signal is mapped by the bit value of the rear bits of the binary code.

In particular, if the first bit value is directly read from the starting bit of the binary code, it indicates that the binary code is at level 0 and corresponds to the sensor signal with the highest occurrence frequency. Specifically, taking the encoding table in Table 1 as an example, if the binary code stream is "0101100," starting from the starting bit of the binary code, the first bit value 0 is read, which indicates that the first binary code is "0" and corresponds to the sensor signal 0 g with the highest occurrence frequency at level 0, and then the second bit value 1 of the second binary code read up to the first bit value 0 is 1, which appears immediately afterwards, indicating that the second binary code is "10" and corresponds to the sensor signal −1 g at level 1, and then the second bit value 1 of the third binary code read up to the first bit value 0 is 2, which indicates that the third binary code is at level 2 and the number of subsequent bits is 1, and the third binary code is "1100." According to the bit value of the subsequent bit, it can be determined that the third binary code corresponds to the sensor signal 1 g at level 2. In summary, the binary code stream "0101100" can be decoded into "0 g, −1 g, 1 g," and so on.

Figure 4:
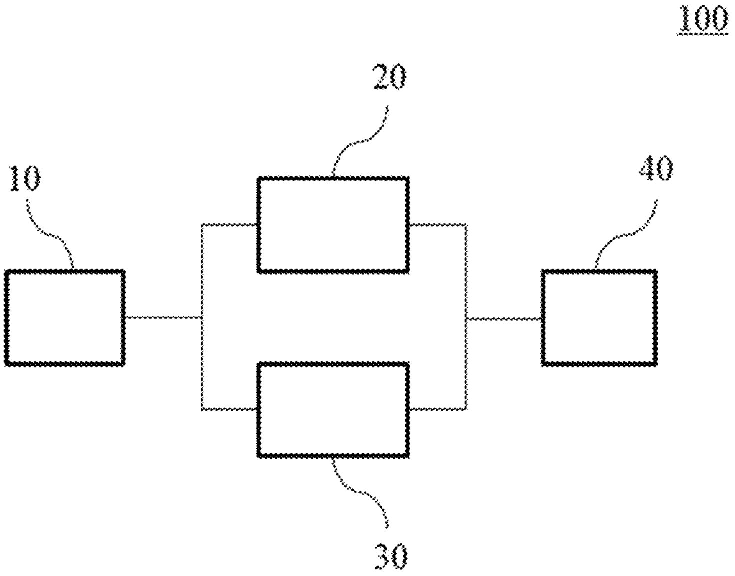
FIG. 4 shows a schematic connection block diagram of a sensor signal processing device for a vehicle according to an exemplary example of the present disclosure.

FIG. 4 shows a schematic connection block diagram of a sensor signal processing device 100 for a vehicle according to an exemplary example of the present disclosure. Here, the processing device 100 may be directly integrated into an electronic control unit of the vehicle, for example.

As shown in FIG. 4, the processing device 100 according to the present disclosure may comprise an encoding table generation module 10 configured to implement the encoding table generation method according to the present disclosure to generate an encoding table for the sensor signal showing the corresponding relationship between the sensor signal and the binary code, wherein the number of coding bits of the binary code is related to the occurrence frequency of the sensor signal.

As shown in FIG. 4, the processing device 100 may comprise an encoding module 20 that may receive sensor signals detected by sensors of the vehicle and an encoding table and be configured to implement the encoding method according to the present disclosure for encoding the sensor signals into a corresponding binary code.

As shown in FIG. 4, the processing device 100 may comprise a decoding module 30 that may receive a binary code stream and coding table and implement the decoding method according to the present disclosure to separate the binary code from the binary code stream and decode the binary code into a corresponding sensor signal.

Here, the processing device 100 may simultaneously comprise an encoding table generation module 10, an encoding module 20, and a decoding module 30, wherein the encoding table generation module 10 is respectively connected with and sends the generated encoding table to the encoding module 20 or the decoding module 30 as needed. However, it is also possible that the processing device 100 comprises any one or any two of the encoding table generation module 10, the encoding module 20, and the decoding module 30, wherein the encoding module 20 and the decoding module 30 may obtain a pre-generated encoding table directly from an external source, such as a cloud device.

Exemplarily, as shown in FIG. 4, the processing device 100 may further comprise a storage module 40 that may be coupled with the encoding table generation module 10 to store the encoding table generated by the encoding table generation module 10, and/or to the encoding module 20 to store the binary code generated by the encoding module 20, and/or to the decoding module 30 to send the stored binary code to the decoding module 30. Here, the storage module 40 may be configured, for example, as a ring buffer that is capable of efficiently managing a buffer of a fixed size, avoiding data spills, and maintaining the orderliness of the data. In particular, the storage module 40 is provided with redundant memory, which may increase tolerances to respond to unexpected extreme situations.

Here, the processing device 100 has a computer program product according to the present disclosure that comprises a computer program that, when executed by one or more processors, can execute the encoding table generation method and/or the encoding method according to the present disclosure and/or the decoding method according to the present disclosure.

The foregoing description of embodiments only describes the present disclosure within the framework of the examples. Certainly, as long as it is technically meaningful, the various features of the embodiments may be freely combined with each other without departing from the framework of the present disclosure.

For those skilled in the art, other advantages and alternative embodiments of the present disclosure are apparent. Therefore, in terms of its broader significance, the present disclosure is not limited to the specific details, representative structures, and exemplary examples shown and described. Conversely, those skilled in the art may make various modifications and alternatives without departing from the essential spirit and scope of the present disclosure.

What is claimed is:

1. An encoding table generation method for sensor signals of a vehicle, comprising:

(S11) obtaining occurrence frequencies of the sensor signals;

(S12) classifying the sensor signals into different levels, according to the occurrence frequencies, with a level number related to a number of encoding bits, wherein levels having higher occurrence frequencies have lower level numbers and are encoded using fewer encoding bits;

(S13) assigning binary codes to the sensor signals in different levels, wherein each binary code has a single middle bit, front bits before the middle bit, and rear bits after the middle bit, the middle bit is written into a first bit value, a number of the front bits characterizes the level and is written into a second bit value, and a number of the rear bits depends on the number of front bits and the value of the sensor signal is mapped out by a bit value of the rear bits; and (S14) generating an encoding table for the sensor signals to establish corresponding relationships between the sensor signals and the binary codes.

2. The method according to claim 1, wherein:

the number of the front bits is equal to the number of the level and the number of the rear bits is equal to the number of the front bits minus 1, sampling values with identical or similar occurrence frequencies are classified to a common level so that the number of the sampling values in the level is equal to $2^n$, and n is equal to the number of the rear bits.

3. The method according to claim 1, wherein:

a sampling value with a highest occurrence frequency is classified into level 0 and the number of the front bits and the number of the rear bits of the binary code corresponding to the sampling value are both 0.

4. The method according to claim 1, wherein:

in step S11, the occurrence frequencies of the sensor signals are obtained based on sampling data statistics, which are experimental data and/or historical data; or in step S11, the occurrence frequencies of the sensor signals are calculated based on an empirical distribution curve.

5. The method according to claim 1, wherein:

the first bit value is 0 and the second bit value is 1; and/or the sensor signal is an acceleration signal.

6. A non-transitory computer readable medium comprising:

a computer program product comprising a computer program, wherein when the computer program is executed by one or more processors, the one or more processors execute the encoding method of claim 1.

7. An encoding method for sensor signals of a vehicle, comprising:

(S21) obtaining the sensor signals and encoding table generated by the method according to claim 1; and (S22) encoding the sensor signals into corresponding binary codes according to the encoding table.

8. The method according to claim 7, further comprising:

(S23) arranging the binary codes corresponding to multiple sensor signals detected sequentially in time in succession to form a binary code stream; and/or (S24) writing a second bit value into unused memory after the sensor signal is encoded.

9. A non-transitory computer readable medium comprising:

a computer program product comprising a computer program, wherein when the computer program is executed by one or more processors, the one or more processors execute the encoding method of claim 7.

10. A processing device for sensor signals of a vehicle, comprising an encoding module configured to implement the method according to claim 7 to encode the sensor signal into a corresponding binary code.

11. A decoding method for sensor signals of a vehicle, comprising:

(S31) obtaining a binary code stream and an encoding table, wherein the binary code stream has at least one binary code encoded by the sensor signals and the encoding table is generated by the method according to claim 1;

(S32) splitting the binary code from the binary code stream by reading the second bit value from a starting bit of the binary code until the first bit value is reached, the bit of the first bit value is the middle bit of the binary code and the bit of the second bit value is the front bit of the binary code, and determining the number of rear bits of the binary code according to the number of the front bits so as to determine the number of encoding bits of the binary code; and (S33) obtaining the sensor signal according to the binary code and the encoding table, wherein the level of the sensor signal is determined by the number of the front bits of the binary code and the value of the sensor signal is mapped by the bit value of the rear bits of the binary code.

12. The method according to claim 11, wherein:

if the first bit value is directly read from the starting bit of the binary code, it indicates that the binary code is at level 0 and corresponds to the sensor signal with a highest occurrence frequency.

13. The method according to claim 11, wherein:

the starting bit of the binary code is determined by a pre-set check code or by the rear bit of a previous binary code.

14. A non-transitory computer readable medium comprising:

a computer program product comprising a computer program, wherein when the computer program is executed by one or more processors, the one or more processors execute the decoding method of claim 11.

15. A processing device for sensor signals of a vehicle, comprising a decoding module configured to implement the method according to claim 11 to decode a binary code into a sensor signal.

16. A processing device for sensor signals of a vehicle, comprising an encoding table generation module configured to implement the method according to claim 1 to generate an encoding table for the sensor signal.

17. The processing device according to claim 16, further comprising a storage module configured to store the encoding table generated by the encoding table generation module and/or a binary code generated by the encoding module.

18. The processing device according to claim 17, wherein:

the storage module is configured as a ring buffer; and/or the storage module is provided with redundant memory.

19. The processing device according to claim 16, wherein: the processing device is integrated in an electronic control unit of the vehicle.

* * * * *